Jan. 31, 1961  J. F. GURLEY, JR  2,969,960
MIXING APPARATUS
Filed June 5, 1957
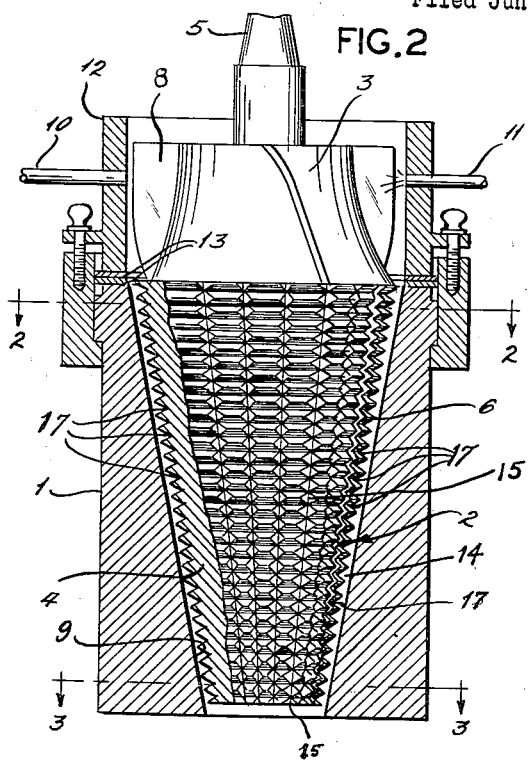
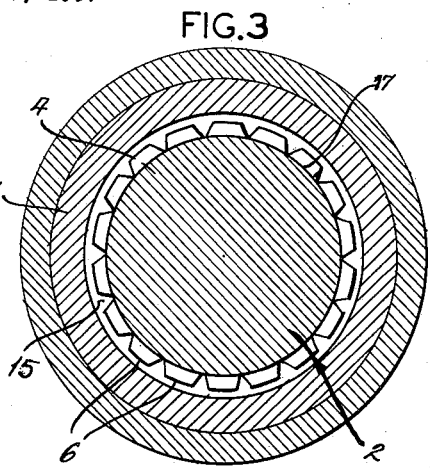
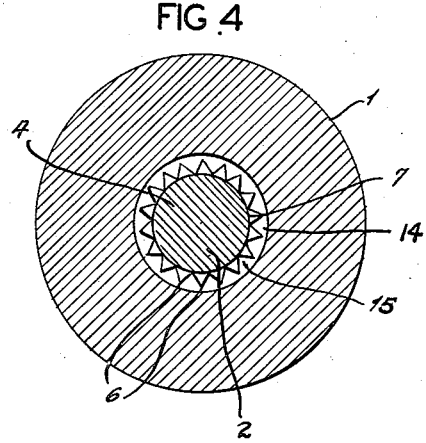
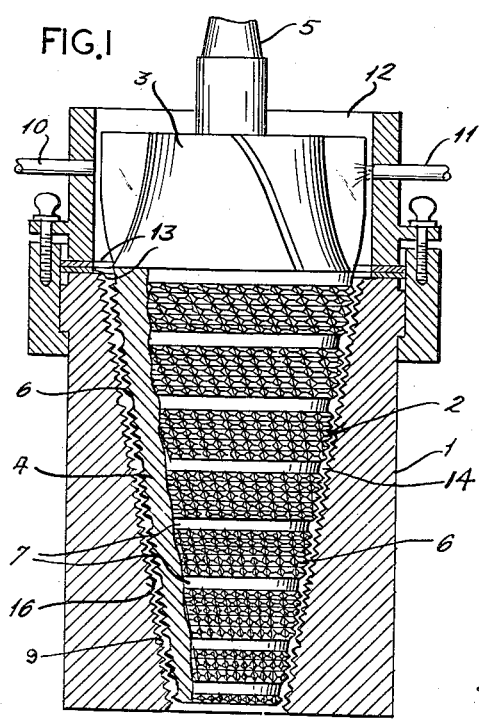
INVENTOR
JESSE FRED GURLEY JR.
ATTORNEY.

United States Patent Office
2,969,960
Patented Jan. 31, 1961

2,969,960

MIXING APPARATUS

Jesse Fred Gurley, Jr., St. Louis, Mo., assignor to Mobay Chemical Company, St. Louis, Mo., a corporation of Delaware Filed June 5, 1957, Ser. No. 663,682

1 Claim. (Cl. 259—7)

This invention relates generally to an apparatus for mixing liquids together and, more particularly, to an apparatus which is especially well suited for mixing the components of a polyurethane plastic.

Polyurethane plastics are prepared by reacting an organic compound having at least two reactive hydrogen atoms, such as, for example, a polyester, a polyalkylene ether, a polyalkylene thioether, a polyester amide, or the like, with a polyisocyanate and then reacting the resulting product with a chain extender or cross-linking agent. Suitable catalysts or accelerators and other additives are usually included in the reaction liquid to vary the rate of reaction and other characteristics. In some processes the organic compound having the reactive hydrogen atoms is first reacted with polyisocyanate and the resulting product having terminal NCO groups is then reacted with the chain extender or cross-linking agent in a separate operation. Both the prepolymer having NCO groups and the organic compound having at least two reactive hydrogen atoms are substantially more viscous than the catalyst, chain extender and activator mixture and are used in a much larger quantity than the latter materials. It is therefore very difficult to disperse uniformly the relatively small volume of less viscous catalyst and chain extender or cross-linker in the larger volume of the more viscous material.

Probably one of the most successful methods for bringing about substantially intimate mixing of the various components of the polyurethane plastic is disclosed in the Hoppe et al. patent, 2,764,565. In accordance with the disclosed process, at least one of the less viscous liquids is injected into a stream of the more viscous organic compound having the reactive hydrogen atoms or into the prepolymer. Hoppe et al. found that substantially complete mixing was obtained if the mixing operation included the injection of the catalyst intermittently or continuously under a pressure substantially higher than that on the more viscous liquid and if the injection was in the form of a relatively fine stream. Polyisocyanate may also be injected into the chamber. The mixing may or may not be supplemented either by stirring the mixture or by agitating it by introducing fluid pressure into the mixing chamber. Although the process and apparatus described in the Hoppe et al. patent brings about complete mixing and produces a substantially uniform product, some difficulty has been experienced in intermittent operation because of chemical reaction and solidification of the mixture in the apparatus. In order to avoid plugging of the discharge nozzle and other openings in the apparatus with solidified plastic, it is necessary to flush the mixing chamber with a suitable scavenger or flushing agent each time the apparatus is used.

It is therefore an object of this invention to provide a mixing device for mixing the components of a polyurethane plastic which is substantially self-cleaning and adapted for intermittent operation. Another object of the invention is to provide an improved apparatus for mixing the components of a polyurethane plastic together which can be used in intermittent operation without flushing or cleaning with a solvent between each operational step. A further object of the invention is to provide an improved mixing apparatus for making polyurethane plastics in an intermittent operation.

Other objects will become apparent from the following description with reference to the accompanying drawing in which:

Figure 1 is a longitudinal view, partially in section, of one embodiment of the invention provided with an agitator and a mixing chamber having baffles on the wall thereof;

Figure 2 is a longitudinal view, partially in section, of another embodiment of the invention;

Figure 3 is a cross-section taken along the line 2—2 of Figure 2; and

Figure 4 is a cross-section taken along the line 3—3 of Figure 2.

The foregoing objects as well as others are accomplished in accordance with this invention, generally speaking, by providing an apparatus having a mixing chamber provided with means for injecting components of a polyurethane plastic therein and agitation means having a shaft and stirrer element comprising a substantially frusto-conically shaped portion having a plurality of tooth-like projections; the mixing chamber being substantially concentric with the frusto-conical portion of the stirrer and only slightly larger in cross-sectional dimensions so that the capacity of the mixing chamber is relatively small. Preferably, in order that the apparatus will be self-cleaning, the stirrer has the shape of two frustums whose bases abut each other. That frusto-conically shaped portion terminating at the shaft is preferably provided with oblique ribs which act as pumping vanes tending to move liquid in the chamber towards the discharge end. The second frusto-conically shaped portion, i.e., the one abutting the frusto-conically shaped portion having the vanes, has the tooth-like projections which enhance its stirring ability. This second frusto-conically shaped portion usually has greater longitudinal dimensions than the portion terminating adjacent the shaft. The mixing chamber may have more than one injection nozzle and the injection nozzles may be located around the circumference of the mixing chamber at one or more locations or may be spaced at intervals circumferentially and/or longitudinally in the mixing chamber. Preferably, however, the injection nozzles are all located at the same level and in the wall of that portion of the chamber opposite the frusto-conically shaped portion of the stirrer having the pumping vanes. As stated above, the mixing chamber, while substantially concentric with the stirrer, is somewhat larger in diameter than the diameter of the stirrer, thereby providing free space between the stirrer and the inner wall of the mixing chamber. It is important that the space between the surface of the conical portion of the agitator and the inner wall of the mixing chamber be held at a minimum in order that the volume available for containing the components to be mixed in the chamber is relatively small. The mixing chamber is preferably of such construction that its position with respect to the stirrer can be changed to provide various sized spaces between the two and thus provide mixing apparatus adjustable to different volumes. The inner wall of the chamber will generally be substantially smooth, but it may be provided with tooth-like projections, protuberances, or the like, which serve as baffles to further improve the mixing.

The apparatus is applicable to the preparation of either cellular or homogeneous rubber-like polyurethane plastics from any suitable mixture of the various known components of a polyurethane plastic. The processes and formulations disclosed in U.S. Patents 2,620,516, 2,621,166 and 2,729,618 as well as the formulations disclosed in the Hoppe et al. patent, 2,764,565, may be used. The injection pressures should be substantially higher than the back pressure in the mixing chamber and may be preferably in the order of from about 300 pounds per square inch to about 15,000 pounds per square inch, although, in some instances, pressures of as low as 100 pounds per square inch may be used. In fact, it is to be understood that the injection pressure only need be substantially higher than the back pressure in the chamber and that the pressure to be used will depend upon the back pressure. The improved agitator provided by this invention makes it possible to use lower injection pressures than would be possible with an agitator of inferior design.

As indicated above, the agitator is composed, essentially, of a shaft driven by a suitable motor and, mounted on the shaft, a stirrer having a pair of substantially frusto-conically shaped elements having their bases lying in abutting relationship. The tooth-like projections on the one frusto-conically shaped portion described hereinbefore are spaced around the circumference of the stirrer and, in a preferred embodiment, the tooth-like projections are in spaced annular rows with a plurality of annular grooves lying between the rows. A suitable discharge orifice is provided at the bottom of the mixing chamber. This discharge orifice may communicate with a suitable conduit which, in turn, communicates with a suitable shaping means or discharge may be directly from the nozzle without any depending conduit.

Another embodiment, preferred because it can be operated with less back pressure in the mixing chamber, also has tooth-like projections on the one frusto-conical portion but this embodiment has a series of longitudinal grooves between the tooth-like projections. In other words, the annular grooves cooperate with longitudinal grooves extending throughout the length of the frusto-conical portion to form the tooth-like projections. Generally, the longitudinal grooves are parallel to the axis of the shaft, but they may be at an angle of less than 90° C. in relation to said axis.

In operating the apparatus, the various components which react to form a polyurethane plastic are introduced into the mixing chamber and the agitator is constantly turning at a relatively high speed, such as, for example, from about 1500 to about 10,000 revolutions per minute. The components rapidly become intimately mixed together, forming a reaction liquid which, within a very short time, will form a solidified polyurethane plastic. Before solidification, the reaction liquid is discharged through the discharge orifice where chemical reaction may proceed. The flow of components into the mixing chamber is stopped and the agitator is revolved after the components are no longer flowing into the chamber. The pumping vanes and the agitator force the liquid remaining in the chamber therefrom, thus cleaning the mixing chamber. When it is desired to make more polyurethane plastic, the process can be repeated.

Referring now to the drawing, Figures 1 and 2 are illustrations, partially in section, of embodiments of the invention having mixing chamber 1 and agitator 2. Agitator 2 is divided into two substantially frusto-conically shaped elements or portions 3 and 4 lying with their bases in abutting relationship. Frusto-conically shaped element 3 has oblique vanes 8 thereon and is fastened to shaft 5. Shaft 5 is driven by a suitable motor or any other suitable means. Frusto-conical portion 4 is provided with a plurality of tooth-like projections 6. In the embodiment shown in Figure 1, the tooth-like projections 6 are separated into rows by a plurality of annular grooves 7. The inner wall 9 of mixing chamber 1 is of such dimensions and shape as to be substantially concentric with frusto-conical portion 4 and only slightly larger in cross section than frusto-conical portion 4. Inlet means for the organic compound having reactive hydrogen atoms or a prepolymer is indicated at 10 and a suitable injection nozzle 11 is provided for injecting the activator mixture or catalyst or polyisocyanate. It is to be noted that in these preferred embodiments, the injection nozzle and inlet means are located substantially adjacent to frusto-conical element 3 and that the mixer is not concentric with this portion of the stirrer. This added space makes it easier to introduce the liquids into the mixing chamber 1. More than one injection nozzle may be provided and polyisocyanate and activator mixture may be injected separately through different nozzles. Element 3 may be truly frusto-conically shaped or only substantially frusto-conically shaped as shown in the drawing.

As illustrated in Figures 1 and 2, mixing chamber 1 may be in the form of a nozzle or chamber which may be mounted onto a head 12. This head 12 may carry the injection nozzle 11 and other inlet means and is supported on a suitable frame. The position of mixing chamber 1 with respect to the frusto-conical element 4 may be varied by using spacer rings 13 of different thicknesses when mounting the chamber 1 on head 12, or this variation in position may be brought about by providing a screw thread means for attaching the nozzle 1 to head 12. Of course, as chamber 1 moves longitudinally with respect to agitator 2, the annular space 14 changes. The addition of ring 13 would move chamber 1 downwardly with respect to agitator 2 and the space 14 would increase. The invention thus provides for the volume of annular space 14 between frusto-conical portion 4 and the inner wall of mixing chamber 1 to be varied. Variation is important because of the variation in viscosity between the components used in making polyurethane plastics of different physical properties which necessitates an adjustment in the period of dwell required in mixing chamber 1.

The embodiment illustrated in Figure 2 is shown in cross-section in Figures 3 and 4 along the lines 2—2 and 3—3, respectively. Frusto-conical element 4 of Figure 2 has a plurality of tooth-like projections 6 formed by the intersection of annular grooves 17 and longitudinal grooves 15. This particular embodiment can be operated with less back pressure in the mixing chamber than the other embodiments, making it easier to provide a suitable seal about the agitator shaft between the supporting bearing assembly and the wall of the mixing chamber. The longitudinal grooves 15 also facilitate cleaning of the apparatus by making it possible to purge the chamber with an anhydrous compressed gas, such as compressed air, nitrogen or the like.

The inner wall 9 of mixing chamber 1 may be provided with tooth-like projections 16 which extend outwardly and between projections on the stirrer, such as is illustrated in Figure 1, or the inner wall may be smooth as in Figure 2. The apparatus of Figure 1 provides for optimum mixing, exceptionally low volume of liquid in the mixing chamber and short residence time in the mixing chamber which are all desirable in making polyurethane plastics.

As indicated hereinbefore, one of the most advantageous characteristics of the apparatus provided by this invention is the relatively low volume of the mixing chamber. As an example, the stirrer element 2 may be only $\frac{1}{16}$ inch or less smaller than the corresponding inner diameter of the mixing chamber. This low volume permits intermittent operation and facilitates cleaning of the apparatus. The stirrer and mixing chamber may be made of any suitable metal or plastic, steel and aluminum having been found particularly well suited for the purpose.

Although the invention has been described in considerable detail in the foregoing for the purpose of illustration, it is to be understood that such detail is solely for this purpose and that variations can be made by those skilled in the art without departing from the spirit and scope of the invention except as is set forth in the claim.

What is claimed is:

An apparatus for mixing liquids together, comprising in combination a chamber and a means for stirring liquids in said chamber until they are substantially intimately mixed together, said chamber having means adjacent one end thereof for admitting liquids and a discharge means adjacent the other end thereof through which the resulting mixed liquids flow from said chamber, said stirring means having the general shape of two frustums which have abutting bases, the apex of one frusto-conically shaped portion of said stirring means lying adjacent said means for admitting liquids into the chamber and the apex of the other substantially frusto-conically shaped portion lying adjacent said discharge means, the last said frusto-conically shaped portion having a plurality of tooth-like projections covering a major portion of the surface thereof, said tooth-like projections being formed by the intersection of a plurality of annular grooves and a plurality of longitudinally extending grooves, said chamber being substantially concentric with and having a diameter only slightly larger in cross-section than the diameter of the last said substantially frusto-conically shaped portion, said chamber having a plurality of tooth-like projections extending therefrom and between tooth-like projections of said stirring means.

References Cited in the file of this patent
UNITED STATES PATENTS

| | | |
|---|---|---|
| Re. 8,845 | Taylor | Aug. 12, 1879 |
| 655,805 | Shellabarger | Aug. 14, 1900 |
| 857,121 | Sturtevant et al. | June 18, 1907 |
| 1,624,567 | Teague | Apr. 12, 1927 |
| 1,794,972 | Mayer | Mar. 3, 1931 |
| 2,017,598 | Keet | Oct. 15, 1935 |
| 2,453,088 | Dulmage | Nov. 2, 1948 |
| 2,857,144 | Gurley et al. | Oct. 21, 1958 |